United States Patent [19]
Thigpen, Jr.

[11] 3,822,749

[45] July 9, 1974

[54] METHOD OF TREATING SUBTERRANEAN FORMATIONS TO IMPROVE PERMEABILITY

[75] Inventor: Arnold B. Thigpen, Jr., Houston, Tex.

[73] Assignee: Texaco Inc., New York, N.Y.

[22] Filed: Oct. 30, 1972

[21] Appl. No.: 301,904

[52] U.S. Cl. ............................. 166/303, 166/305 R
[51] Int. Cl. ..................... E21b 43/20, E21b 43/24
[58] Field of Search........ 166/272, 275, 303, 305 R; 252/8.55 R

[56] References Cited
UNITED STATES PATENTS

| | | | |
|---|---|---|---|
| 2,761,836 | 9/1956 | Brown et al. | 252/8.55 R |
| 2,761,837 | 9/1956 | Brown et al. | 252/8.55 R |
| 2,947,360 | 8/1960 | Bernard | 166/305 R |
| 3,349,032 | 10/1967 | Krieg | 252/8.55 R |
| 3,353,593 | 11/1967 | Boberg | 166/272 |
| 3,379,249 | 4/1968 | Gilchrist et al. | 166/303 |
| 3,422,890 | 1/1969 | Darley | 166/305 R |
| 3,444,931 | 5/1969 | Braden | 166/303 |
| 3,454,095 | 7/1969 | Messenger et al. | 166/303 |
| 3,603,396 | 9/1971 | Braun | 166/305 R |
| 3,610,338 | 10/1971 | Payton et al. | 166/272 |

*Primary Examiner*—Stephen J. Novosad
*Assistant Examiner*—Jack E. Ebel
*Attorney, Agent, or Firm*—T. H. Whaley; C. G. Reis

[57] ABSTRACT

A method of treating wells drilled in the earth and the subterranean formation surrounding and in fluid communication with the wells by injecting into the wells and surrounding formation a gaseous mixture comprising steam and an aliphatic polyamine such as ethylenediamine, diethylenetriamine, triethylenetetramine, or piperazine, to increase the fluid permeability of the formation, especially formations which have sustained a permeability decline due to contacting water sensitive clay with fresh water.

18 Claims, 3 Drawing Figures

METHOD OF TREATING SUBTERRANEAN FORMATIONS TO IMPROVE PERMEABILITY

BACKGROUND OF THE INVENTION

1. Field of the Invention

This invention relates to a method for treating subterranean formations, such as petroleum bearing subterranean formations, for the purpose of increasing the permeability of such formations to facilitate the flow of hydrocarbons from the formation into a producing well drilled in the formation or to facilitate injection of extraneous fluids into the formation via injection wells. More particularly, this invention pertains to a method for treating subterranean formations with a gaseous mixture of steam and a polyamine such as ethylenediamine, diethylenetriamine, triethylenetetramine, or piperazine to increase the permeability of the formation, thereby improving the flow of hydrocarbons from the formation into the well drilled into the formation and/or increasing the flow of extraneous fluids into the formation.

2. Description of the Prior Art

Petroleum is frequently found in subterranean formations or reservoirs in which it is accumulated, and recovery is initially accomplished by pumping or permitting the petroleum to flow to the surface through wells drilled into the subterranean formation for that purpose. In order to obtain production of petroleum from such subterranean formations, it is necessary to have a number of conditions present, such as an adequately high concentration of petroleum, and sufficient interconnected flow channels throughout the formation to permit the flow of fluids therethrough if sufficient pressure is applied to the fluids. When natural energy sources such as an underlying active water drive, solution gas, or a high pressure gas cap in the petroleum containing formation, are used to cause flow of the petroleum into the wells, the process is referred to as primary production. When this natural energy source is depleted, or in the instance of formations which did not originally contain the proper conditions for primary recovery, some form of supplemental recovery process must be resorted to. This is frequently referred to as secondary recovery, although in fact it may be primary, secondary, or tertiary in sequence of employment. Commonly used supplemental recovery techniques involve the injection into the formation of an extraneous fluid such as water, or steam, or water containing various additives such as surfactants or viscosity imparting polymers, or combinations of several of these materials. Regardless of the type of recovery process used, it is essential to the success of the program that the formation have adequate permeability to permit flow of petroleum through the formation.

Subterranean petroleum containing formations are frequently found which contain a relatively high percentage of petroleum, but the initial permeability of the formation is too low to permit recovery of petroleum contained therein by any means, either primary or supplemental. Fracturing and acidizing of such so-called tight formations are frequently employed with considerable success, but there are many formations which still resist all attempt by known means to recover petroleum from them.

In still other instances, petroleum containing subterranean formations are known in which the rock or mineral matrix contain clays or clay-like materials which swell on contact with water, especially fresh water, with the result that the permeability to fluid flow drops dramatically after only a brief contact. These clay materials originally present in the formation can reduce the permeability of the formation by swelling and restricting the physical size of the flow channels, or by migrating and collecting in localized areas to form bridges or blocks in the pores of the formation.

Numerous types of clays are commonly found in natural geological formations which are capable of causing permeability losses on contact with fresh water, and which can be treated effectively by the present invention. These include the montmorillonite group such as montmorillonite, saponite, nontronite, hectorite, and sauconite; the kaolin group such as kaolinite, nacrite, dickite, and halloysite; the hydrous-mica group such as hydro-biotite, glauconite, illite, and bramallite; the chlorite group such as chlorite and chamosite; clay minerals not belonging to the above group such as vermiculite, attapulgite, and sepiolite. Formations may contain only a single species of clay mineral such as those enumerated above, or combinations thereof including mixtures of mixed layers of clay.

The aqueous fluid which causes the formation damage may be introduced into the formation by a variety of means, such as in the form of drilling fluid filtrate, injection water, water from leaks in or behind the casing, or ground water associated with the formation. A particularly serious problem has been noted in the more recently developed supplemental recovery techniques of thermal stimulation. When steam is injected into a subterranean formation for the purpose of stimulating the oil recovery therefrom, the steam vapor travels some distance through the formation, losing heat as it progresses through the cooler formation, and ultimately condenses. The condensate from this injected steam is pure water which causes a very rapid deterioration of permeability if water sensitive clays are present in the formation. Another form of thermal stimulation, in situ combustion, produces the same harmful permeability loss. When air is injected into a formation and the formation is ignited by some external heat source, one of the products of the underground combustion reaction is water, which is generally converted into steam by the heat generated by the combustion front itself. This insitu generated steam travels rapidly into the formation, losing heat and ultimately condensing. Again this very pure water causes a serious loss in permeability in those formations containing water sensitive clays. This is an especially difficult problem to treat, since the formation damage occurs somewhat deeper in the formation, rather than immediately adjacent to the wellbore as is the case with drilling fluid filtrate invasion.

Permeability modification processes which are undertaken in conjunction with oil recovery operations may be categorized in the following manner. Low permeability formations whose poor fluid flow properties are not associated with water sensitive clays, such as tight sandstone and limestone formations, require the use of a material to physically fracture or chemically dissolve or react with a sufficient portion of the rock matrix to enlarge the flow channles so that adequate fluid flow may be obtained. Several types of permeability problems associated with water sensitive clay contents are encountered. It may be necessary to remedy a severe problem which has cocurred as a result of accidental contact between the water sensitive clay containing formation and fresh water as by drilling fluid filtrate, or as a result of injection of water or aqueous base displacing fluids in the case of supplemental recovery operations. In these cases it will be necessary to reverse the clay swelling that has already occured and restore fluid permeability to a usable level. In other instances, the water sensitive character of the formation is known in advance, and it is necessary to pretreat the formation to prevent the clay swelling from occurring before an aqueous displacing fluid is injected into the formation. It is generally recognized that it is substantially more difficult to reverse clay swelling that has already occurred than it is to prevent clay swelling by pretreating a water sensitive formation before it is contacted with fresh water.

The problems associated with permeability loss due to clay swelling upon contact with fresh water has become especially acute with the advent of thermal recovery techniques. The problem is aggravated by the complex nature of multiphase flow phenomena in porous media. If a quantity or slug of liquid phase treating material is injected into a formation and is followed by a liquid phase displacing media, the relative position of the two injected materials will remain constant in most instances, with the treating material always contacting the formation in advance of the displacement liquid. If, however, a treating composition is injected in liquid phase into a formation and a vapor or gaseous phase displacing media is injected behind it, the displacement mechanism is much more complex. The injected gaseous displacing material will quickly channel through the liquid treating material and will move into the untreated formation ahead of the liquid phase treating material. Channeling past the injected treating liquid can occur very quickly, often after traveling only a few inches or feet into the formation. After the injected vapor has bypassed the treating liquid, the vapor will condense and contact portions of the formation not yet contacted and treated by the injected liquid treating composition. It is for this reason that a liquid phase pretreating material will not effectively desensitize a water sensitive formation which is to be stimulated by steam injection or in situ combustion.

For purposes of illustration, consider a situation in which a material known to effectively desensitize water sensitive clay containing formations is injected into a formation and followed with the injection of steam. Steam entering the formation is principally in the vapor phase and it quickly channels through the liquid pretreatment slug and moves into the formation ahead of the pretreatment liquid slug. Since the temperature of the steam vapor is considerably above the temperature of the formation, as the steam vapor flows into the formation it is continually losing heat to the formation matrix, and eventually condenses to form relatively pure water. Since condensation occurs in advance of the pretreatment chemical slug, it occurs in a portion of the formation which has not been treated to desensitize it to fresh water. Steam condensate being relatively pure water, substantial permeability loss results from rapid clay swelling. As this permeability loss occurs, fluid flow into the formation is restricted dramatically or even stopped entirely, and so it is very difficult for subsequently injected treating chemical to reach the area where it is needed. Moreover, as stated above, many chemicals which will prevent the swelling of water sensitive clays quite effectively are ineffective at reversing the process once it has already occurred. Thus it can be seen that there is a very great need for a treatment method capable of permanently treating water sensitive clays so as to prevent their swelling when contact is made with fresh water, and more importantly, a process is needed which will insure that the treating material will reach the water sensitive clays before they are contacted with fresh water.

This general problem has been recognized and there are numerous prior art techniques available for preventing formation permeability loss due to clay swelling. The mechanism has been discussed in various terms, such as conversion of swelling type clays as to nonswelling type clays, or adsorption of the treating material onto the surface of the clay to inhibit the swelling phenomena. For example, U.S. Pat. No. 3,543,858 (1970) describes a method employing an aqueous solution of potassium chloride and heating the formation to a temperature of 260°C. (500°F.) This procedure is said to convert the swelling type clays to nonswelling clays. It is apparent that the temperature and heating periods are extremely difficult to realize in a subterranean formation.

Another technique for preventing clay swelling or restoring permeability of a damaged formation is disclosed in U.S. Pat. No. 3,237,692 (1966) which involves injecting a soluble alkali metal salt at a temperature of 185°C. into the water sensitive formation. Once again the high temperature and other requirements of this process render it unsuitable for many applications.

In U.S. Pat. No. 2,761,843 (1956) teaches the use of water soluble salts of alkyl polyamines for treating water sensitive formations to prevent permeability loss on contact with fresh water or to reverse permeability loss that has already occurred. While this material appears to be quite effective for supplemental recovery techniques involving the injection of water or other liquid phase displacing media, it is generally not satisfactory for thermal recovery techniques since the liquid treating composition will be unable to contact the formation in advance of the water condensing from steam vapor which has bypassed the liquid treating composition.

A treating method involving a gaseous phase treating composition is disclosed in U.S. Pat. No. 2,908,641 (1959), which teaches the use of gaseous phase primary alkyl amines for the purposes of treating formations to improve the flow of hydrocarbons therethrough while hindering the flow of water. The method requires that the amine be dissolved in a large amount of hydrocarbon solvent such a kerosine, with not more than five percent active material, and the entire material is injected into the formation in the instance of oil producing formations. The very low temperature boiling monoamines are vaporized and injected into gas wells for the purpose of increasing the flow of gas and decreasing the flow of water. Because of a very low boiling point of these materials, they will condense very slowly upon passing through the formation and may remain in the vapor phase when used in a thermal recovery operation. For this reason they are not particularly effective in such applications.

My invention discloses a method whereby treatment of the formation will occur at precisely the location and time that it is needed to prevent condensate water damage in water sensitive clay containing formations being stimulated by thermal means, to achieve results not attainable by the methods disclosed in the prior art.

SUMMARY OF THE INVENTION

This invention is a method of treating formations having adversely low permeability or which develop adversely low permeability upon contact with fresh water, comprising injecting into the reservoir a vapor phase treating composition. The treating composition comprises vapor phase alkyl polyamines having a boiling point at least as great as the boiling point of water, and which are soluble in water. Examples of such alkyl polyamines are ethylenediamine, diethylenetriamine, triethylenetetramine, and piperazine. These materials may be injected in a pure vapor form, or a mixture of steam vapor and the vaporized material may be injected into the formation prior to the injection of steam in the instance of steam stimulation, or in advance of air injection in the case of in situ combustion stimulation.

DESCRIPTION OF THE PREFERRED EMBODIMENTS

Generally the process of my invention is accomplished by contacting the subterranean petroleum containing formation with a vapor phase treating composition comprising an aliphatic polyamine such as ethylenediamine. Other materials usable in this treating method include diethylenetriamine, triethylenetetramine, and cyclic polyamines such as piperazine. Any linear aliphatic polyamine having the following formula may be used:

where $n$ is from one to three.

Cyclic compounds having the following formual:

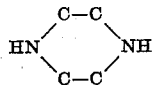

will also function according to my invention. It is necessary that the boiling point of the compound being used be greater than the boiling point of water, and that the material be soluble in water. Table I below lists the boiling point and solubilities of four typical aliphatic polyamines, as well as for water for comparative purposes.

TABLE I

| Compound | Boiling Point °C. | Solubility in Water |
|---|---|---|
| Water | 100 | ∞ |
| Ethylenediamine | 116.5 | ∞ |
| Diethylenetriamine | 208 | ∞ |
| Triethylenetetramine | 266 | vs |
| Piperazine | 145 | s |

Figure 1:
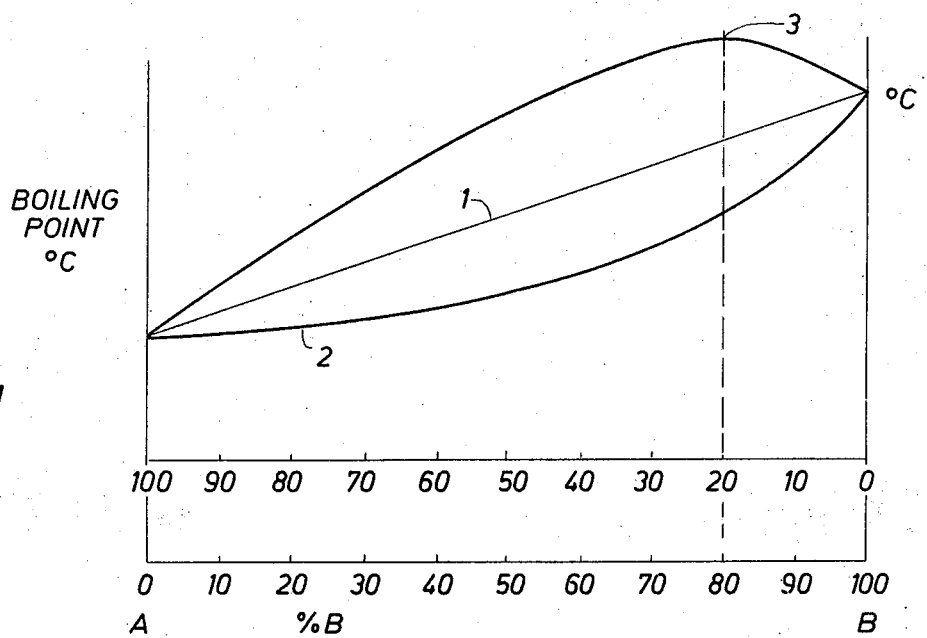
FIG. 1 is a graph of the boiling point versus percent composition for three typical binary miscible systems.

When two miscible components are exposed to increasing temperature under a constant pressure, the graph of the boiling point of the binary systmm as a function of the composition of the system will correspond to one of three general forms as depicted in FIG. 1. If the boiling point versus composition relationship is approximately a straight line as shown in 1, the binary system is said to be an ideal solution. Many materials deviate from this ideal relationship, and in extreme examples this deviation from the ideal can be so severe as to exhibit a minimum boiling point as is shown in 2 or a maximum boiling point as is shown in 3. Binary systems exhibiting a maximum boiling point 3 are known as maximum boiling point azeotropic solutions. Such maximum boiling point azeotropes are fairly rare and exhibit many unexpected results. Normally, it is possible to separate two miscible components having different boiling points by distillation, but it is not possible to separate maximum boiling point azeotropes by distillation. The temperature of the solution will increase as the composition changes until the composition corresponding to the maximum boiling point is reached, at which time the liquid and vapor will have the same composition and the material will continue to boil at this constant boiling point. Ethylenediamine and water form such a maximum boiling point azeotropic system, and the maximum of the boiling point versus composition curve for ethylenediamine and water is 119°C. which corresponds to a composition of 82 percent ethylenediamine and 18 percent water.

Although the reasons are not fully understood, I have found that compounds exhibiting this maximum boiling point azeotropic phenomena are especially desirable materials for use in this invention. I have also discovered that vapor composition corresponding to the azeotropic mixture produces the most dramatic improvement in formation permeability, and is similarly the most effective treating material for reversing permeability damage caused by contacting water sensitive clay containing formations with fresh water.

Figure 2:
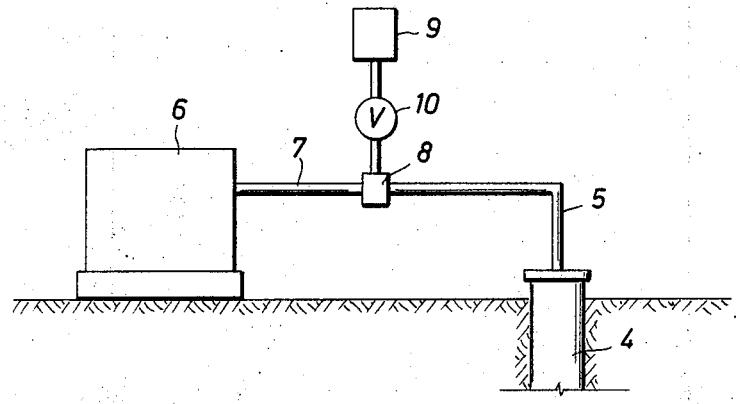
FIG. 2 illustrates the surface equipment used to facilitate injecting the treating composition into a well.

In the practice of this invention, the well is completed generally as is shown in FIG. 2, with the well bore being completed at the surface for the injection of fluid through conduit 5. There are several field applications in which this invention is useful. Single well stimulation is a process in which steam or some other thermal stimulation fluid is injected into a well for a period of time, after which injection is terminated and production of formation hydrocarbons from the same well is initiated and continued for so long as production rates remain sufficiently high. The invention is also suitable for use in throughput secondary or tertiary recovery operations, of the type; wherein a vapor such as steam is injected into a formation continually through one or more injection wells, and oil production is taken from one or more production wells on a continual basis, with the wells being spaced some distance apart. These injection and production wells may be arranged in a variety of patterns. The so-called inverted five spot pattern shown in FIG. 3 is one of the most commonly used patterns for field exploitation.

FIG. 2 illustrates schematically a surface arrangement for injection of steam into the injection well 4, the steam being generated in the steam generator 6 which is fired by any convenient fuel such as natural gas. Steam is passed through conduit 7 into a mixing chamber 8. A supply of treating composition is available in container 9 and is added to the mixing chamber 8 through valve 10 at a predetermined rate to provide the desired concentration of treating composition and water. In the case of using ethylenediamine and steam, ethylenediamine is added at a rate which will produce a vapor phase mixture having aproximately 82 percent ethylenediamine and 18 percent water. During this preliminary treating phase, it is desirable that the steam quality be relatively high, at least 80–90 percent by weight steam vapor. This high quality steam is not required during the subsequent phase, however, and it is generally more economical to inject lower quality steam, in the range of 60 to 70 percent by weight.

The rate at which the treating composition, such as the 82 percent ethylenediamine and 18 percent steam vapor, is injected into the formation is not critical for the success of this process. The material may be injected at the highest rate possible considering the injectivity of the formation being treated. The quantity of the treating vapor to be injected depends on various parameters of the formation. The thickness of the formation will be known, and it is satisfactory to inject from about 10 to about 60 pounds of the polyamine per foot of formation thickness.

Figure 3:
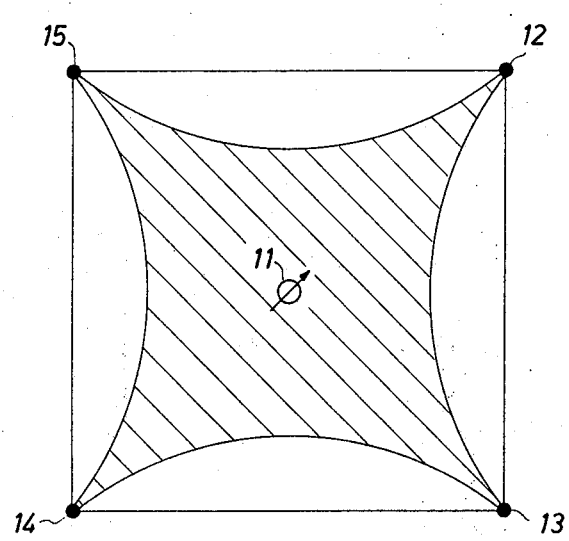
FIG. 3 is a plan view of an inverted five spot pattern showing the portion of the formation swept by injected fluid.

For example, if the formation thickness is 30 feet in a subterranean hydrocarbon containing reservoir located at a depth of 4,000 feet and field exploitation is undertaken using a conventional five spot pattern, each segment of the field will be essentially as is shown in FIG. 3, which illustrates a segment of approximately square configuration, with one injection well 11 located in the center of the square and four producing wells 12, 13, 14, and 15 located at each corner of the square. The distance between adjacent production wells for a typical spacing will be in the order of 900 feet. It should be realized, of course, that in a large field each production well will be associated with four such five spot patterns, but the performance of each pattern will be essentially the same so it is possible to analyze the overall performance by looking at only a single segment. It is well known that the displacement efficiency of any recovery process involving the injection of an extraneous fluid for the purpose of pushing oil to a production well is relatively low, and in the pattern as is shown in FIG. 3 only about 70 percent of the formation will be swept by the injected fluid. More sophisticated well completion patterns such as the seven well Delta disclosed in U.S. Pat. No. 3,380,525 or the ten well Delta pattern of U.S. Pat. No. 3,380,523 will of course result in higher sweep efficiencies. The well pattern already established in many of the older fields often requires the use of the less efficient five spot pattern as is shown in FIG. 3. In such a field with a formation porosity of 25 percent, the pore volume of a formation to be swept will equal $900 \times 900 \times 30 \times 0.7 \times 0.25 = 4,252,500$ cubic feet.

It would obviously not be economically feasible to inject sufficient treating material to saturate all of this volume; however, in such a large field the dominant effect of permeability loss is from that portion of the formation matrix immediately adjacent to the injection well bore. In most instances it is satisfactory to inject a quantity of treating vapor sufficient to treat the formation from about three to about ten feet away from the injection wellbore. This will be accomplished by using from about ten to about sixty pounds of polyamine treating composition per foot of formation thickness. In the example given, twenty pounds of ethylenediamine are injected per foot of formation thickness. This means six hundred pounds ($30 \times 20 = 600$) of ethylenediamine is vaporized and mixed with steam in the weight ratio of 82 parts ethylenediamine to 18 parts water and injected into the formation, after which normal steam injection is continued.

The method of my invention may be applied to any supplemental recovery operation being performed on a subterranean hydrocarbon containing reservoir, which involve the injection of an extraneous fluid to drive the hydrocarbon to producing wells from which it is recovered and brought to the surface. This invention is especially useful in the instance of steam injection as has been described previously, and is also useful in so-called in situ combustion recovery processes. In situ combustion is a method for stimulating the production of hydrocarbons from a subterranean reservoir, and involves the injection of air into one or more injection wells and the addition of sufficient heat to initiate a combustion reaction within the reservoir which progresses outward from the injection well and forces the petroleum to move at a faster rate through the formation toward the production well than would be possible if an unheated fluid were used as the injection fluid. Water is a principal product of combustion, and water is quickly converted into steam vapors. This insitu generated steam travels in advance of the in situ combustion front progressing through the reservoir, and can cause permeability losses similar to that encountered in the use of steam injection. Thus, it is possible to encounter permeability losses in a water sensitive clay containing formation even though no water as such has been injected into the formation, when an in situ combustion process is being carried out in the petroleum reservoir.

The method of my invention may also be used to treat the formation immediately adjacent to a production well which has been inadvertently contacted with fresh water, thereby causing a permeability decrease. This will necessitate suspending normal oil production for sufficient time to permit injection via quantity of the treating material into the production well and deep enough into the producing formation to contact the damaged portion thereof. It is satisfactory to inject only enough treating composition to contact from about three to about ten feet into the formation immediately adjacent to the producing well. No additional heating of the formation is necessary and no waiting time is required; production of hydrocarbons from the formation may be resumed immediately upon completion of the injection of the required quantity of treating composition. It is preferably to inject the material in the form of a vapor phase mixture of the aliphatic polyamine, e.g. ethylenediamine and steam, rather than in liquid form or in the form of pure ethylenediamine vapors.

There are numerous other situations where the treating method of my invention can be applied to correct adversely low permeability situations existing in subterranean formations. The above illustrations are not intended to be exhaustive or restrictive.

EXPERIMENTAL

The following examples detail the results of laboratory evaluation and experiments undertaken to establish the technical feasibility and operability of my invention. Plugs were cut from cores taken from the Sespe formation, a known water sensitive petroleum containing formation. The cores were analyzed by X-ray diffraction techniques and found to contain approximately 15 percent montmorillonite, a clay known to be highly sensitive to fresh water and to exhibit the swelling phenomenon. The plugs used in this experiment were 2.2 centimeters in length and 2.2 centimeters in diameter, and weighed approximately 18 grams. The plug and a quantity of the aliphatic polyamines were heated in a sealed 275 milliliter stainless steel vessel, each in separate holders so that the only contact was by diffusion of vapors as external heat was applied to the vessel. The contact time in all instances was 16 hours, and the system was maintained at 150°C. The effectiveness of the treatment was demonstrated by measuring the permeability of the treated plug to water and comparing the values obtained with untreated plugs.

In Example I, one of the plugs was heated under the stated conditions in the presence of 0.1 gram of ethylenediamine in a sealed container at autogenous pressure. The results, listed in Table II below, compare the permeability of the core treated with ethylenediamine with an identical core that had not been treated. Permeability of both the treated and untreated core was measured after ten pore volumes of water had been passed through the core, and again after the passage 25, 50, 100 and 200 pore volumes of water, to determine the persistence of the treatment. As can be seen from the data, the permeability at each point of equal pore volumes of water throughput is approximately three times as great for the core treated with ethylenediamine vapor than with the untreated core. The permeability of the core treated with ethylenediamine vapor, after 200 pore volumes of water has been passed through it is still approximately twice the permeability of the untreated core after injection of only 10 pore volumes of water.

TABLE II

| Pore Volumes of Water | Permeability, millidarcy | |
|---|---|---|
| | Treated with Ethylenediamine vapor | Not treated |
| 10 | 0.37 | 0.12 |
| 25 | 0.36 | 0.11 |
| 50 | 0.34 | 0.11 |
| 100 | 0.30 | 0.09 |
| 200 | 0.23 | 0.08 |

The second experiment was conducted using plugs cut from cores taken from a slightly different depth of the same Sespe formation. In one instance the plug was treated with 0.1 gram of ethylenediamine, and in another instance a different plug was treated with 0.025 grams of ethylenediamine and 0.075 grams of water. The permeabilities of the two treated cores and an identical untreated core were measured after 10, 25, 50, 100, 200 and 300 pore volumes of fresh water had been passed through the cores. The data presented in Table III below confirms the effectiveness of ethylenediamine vapor for densensitizing a clay containing formation to permeability loss, but further revealed the unexpected result that ethylenediamine and water vapor are considerably more effective than ethylene diamine vapor alone.

TABLE III

| Pore Volumes of Water | Permeability, millidarcies | | |
|---|---|---|---|
| | Treated with Ethylenediamine vapor | Treated with Ethylenediamine and water vapor | Not treated |
| 10 | 17.6 | 32.4 | 2.5 |
| 25 | 13.8 | 20.0 | 2.1 |
| 50 | 10.0 | 10.8 | 1.4 |
| 100 | 6.4 | 4.2 | 0.8 |
| 200 | 3.9 | 2.1 | 0.7 |
| 300 | 2.1 | 1.4 | |

In another experiment, plugs taken from similar Sespe cores were treated as above except the treatment consisted of exposing the plug to 0.025 grams of piperazine and 0.075 grams of water. In this test another core was exposed to water vapor only for comparative purposes. The permeabilities of the two cores were measured after the passage of 10, 25, 50, 100 and 200 pore volumes of water through the core. The results shown in Table IV, indicate piperazine and water vapor effectively reduced the sensitivity of this particular plug to permeability loss due to contacting fresh water.

TABLE IV

| Pore Volumes of Water | Permeability, millidarcies | |
|---|---|---|
| | Treated with piperazine and water vapor | Treated with water vapor only |
| 10 | 29.6 | 15.8 |
| 25 | 21.8 | 12.5 |
| 50 | 9.2 | 7.6 |
| 100 | 5.7 | 3.5 |
| 200 | 2.6 | 1.1 |

Another laboratory experiment was conducted to determine the optimum weight ratio between the water sensitive clay sought to be desensitized, and the ethylenediamine and water treatment. Samples of a high grade Bentonite clay, containing at least 98 percent montmorillonite, was exposed to vapor from various quantities of ethylenediamine and water and at several reaction temperatures. The treated clay was then formed into a filter cake from 25 cc. samples of an aqueous slurry of the treated material and the filtration rate of water through the filter cake was measured. The cake thickness was 0.1 millimeters and the filtration was by applied vacuum of 350 millimeters. 0.8 micron pore size filter paper was used, and the filtration rate was determined by measuring the time required to filter the first 250 cc's. of filtrate and is expressed in terms of volume of filtrate per second per unit of filter area. Where more than one rate value is given, it represents the results of identical repeat runs for purposes of establishing reproducibility of the results. The filtration rate of montmorillonite pretreated only by exposure to water vapor, with no ethylenediamine present, was determined to be less than 0.001 cc. per second per centimeter square.

TABLE V

| Treatment Temperature °C. | Weight Ratio of reactants clay: water: ethylenediamine | Filtration Rate cc/sec/cm$^2$ |
| --- | --- | --- |
| 300 | 2: 1: 0.3 | 0.05, 0.06, 0.05 |
| 300 | 2: 1: 0.3 | 0.05, 0.06 |
| 150 | 2: 1: 0.1 | 0.02, 0.02 |
| 170 | 2: 0: 0.3 | 0.08 |
| 170 | 2: 0: 0.1 | 0.03 |
| 170 | 2: 1: 0.0 | 0.001 |

Thus I have shown by the above laboratory data that the water sensitive clay containing formations can be stabilized with respect to their permeability of the passage of fresh water under conditions which permit the use of the treating method in conjunction with thermal recovery techniques. Minor variations of this method will be apparent to those skilled in the art, and the foregoing examples are intended only to be illustrative of the invention, the true spirit and scope of which are defined in the appended claims.

I claim:

1. In a thermal method of recovering petroleum from a subterranean petroleum containing formation of the type wherein a gaseous phase displacing fluid is injected into the formation, said formation containing clayey materials which swell when contacted with water, wherein the improvement comprises:
   a. injecting into said formation prior to injecting said displacing fluid, a gaseous phase treating composition comprising an aliphatic polyamine, to desensitize the water sensitive formation to subsequent contact with water.

2. A method as recited in claim 1 wherein the aliphatic polyamine is selected from the group consisting of ethylenediamine, diethylenetriamine, triethylenetetramine, piperazine, and mixtures thereof.

3. A method as recited in claim 1 wherein the aliphatic polyamine is ethylenediamine.

4. A method as recited in claim 1 wherein the aliphatic polyamine is diethylenetriamine.

5. A method as recited in claim 1 wherein the aliphatic polyamine is triethylenetetramine.

6. A method as recited in claim 1 wherein the aliphatic polyamine is piperazine.

7. A method as recited in claim 1 wherein said treating composition additionally contains steam having a quality of at least 80 percent.

8. A method as recited in claim 7 wherein the steam and aliphatic polyamine are in the form of a gaseous azeotropic mixture.

9. A method as recited in claim 1 wherein from about 10 to about 60 pounds of the aliphatic polyamine per foot of formation thickness are injected into the formation.

10. A method as recited in claim 1 wherein the gaseous phase displacing fluid is steam.

11. A method as recited in claim 1 wherein the gaseous phase displacing fluid is air.

12. A method of increasing the permeability of a subterranean petroleum containing formation, which formation contains water sensitive clayey materials which have been contacted previously with water, comprising:
   a. injecting into said formation a mixture of vaporized aliphatic polyamine and steam.

13. A method as recited in claim 12 wherein the vaporized aliphatic polyamine is selected from the group consisting of ethylenediamine, diethylenetriamine, triethylenetetramine, piperazine, and mixtures thereof.

14. A method as recited in claim 12 wherein the vaporized aliphatic polyamine is ethylenediamine.

15. A method as recited in claim 12 wherein the vaporized aliphatic polyamine is diethylenetriamine.

16. A method as recited in claim 12 wherein the vaporized aliphatic polyamine is triethylenetetramine.

17. A method as recited in claim 12 wherein the aliphatic polyamine is piperazine.

18. A method as recited in claim 12 wherein from about 10 to about 60 pounds of aliphatic polyamine per foot of formation thickness are injected into the formation.

* * * * *